United States Patent
Sventek et al.

(10) Patent No.: US 10,265,826 B2
(45) Date of Patent: Apr. 23, 2019

(54) METHOD OF FORMING A RECESS IN A SUBSTRATE

(71) Applicant: 3M INNOVATIVE PROPERTIES COMPANY, St. Paul, MN (US)

(72) Inventors: Bruce A. Sventek, Woodbury, MN (US); Mitchell L. Nelson, Minneapolis, MN (US); David G. Baird, Woodbury, MN (US); Kathryn R. Bretscher, Minnetonka, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 350 days.

(21) Appl. No.: 14/896,011

(22) PCT Filed: Jun. 4, 2014

(86) PCT No.: PCT/US2014/040830
§ 371 (c)(1),
(2) Date: Dec. 4, 2015

(87) PCT Pub. No.: WO2014/197551
PCT Pub. Date: Dec. 11, 2014

(65) Prior Publication Data
US 2016/0129544 A1 May 12, 2016

Related U.S. Application Data

(60) Provisional application No. 61/832,327, filed on Jun. 7, 2013.

(51) Int. Cl.
*B24B 5/04* (2006.01)
*B24B 7/24* (2006.01)
(Continued)

(52) U.S. Cl.
CPC .............. *B24B 19/03* (2013.01); *B24B 5/042* (2013.01); *B24B 7/241* (2013.01); *B24B 7/242* (2013.01);
(Continued)

(58) Field of Classification Search
CPC ........... B24B 5/04; B24B 5/045; B24B 5/047; B24B 5/423; B24B 7/241; B24B 7/242;
(Continued)

(56) References Cited

U.S. PATENT DOCUMENTS 2,067,089 A * 1/1937 Kirchner ................. B24D 5/00
451/489
2,978,847 A * 4/1961 Schoenmakers ....... B24D 5/123
125/15
(Continued)

FOREIGN PATENT DOCUMENTS

CA 2150320 11/1996
CN 101056741 A 10/2007
(Continued)

OTHER PUBLICATIONS

Gahlin, "The crater grinder method as a means for coating wear evaluation—an update", Surface and Coatings Technology, 1997, vol. 90, pp. 107-I14.
(Continued)

*Primary Examiner* — Timothy V Eley
(74) *Attorney, Agent, or Firm* — Adam Bramwell; Bradford B. Wright

(57) ABSTRACT

A method of forming a recess in a surface of a substrate includes: providing an abrasive article comprising a structured abrasive member disposed along a peripheral surface of a support member, frictionally contacting the structured abrasive layer with a surface of a substrate, longitudinally advancing the structured abrasive layer relative to the sur-
(Continued)

face of the substrate; and rotating at least one of the abrasive article or the substrate relative to the other around a rotational axis perpendicular to the surface of the substrate such that the structured abrasive layer maintains contact with and abrades the surface of the substrate. The structured abrasive member comprises a structured abrasive layer comprising shaped abrasive composites secured to a backing, wherein the backing is proximate to the support member. The shaped abrasive composites comprise abrasive particles retained in a binder material. The present disclosure also provides an abrasive wheel comprises a structured abrasive member disposed on a peripheral surface of a support wheel and display covers including a spherically concave recess abutting a cylindrical passage.

9 Claims, 6 Drawing Sheets

(51) Int. Cl.
   B24D 5/06     (2006.01)
   B24D 5/12     (2006.01)
   B24B 13/015   (2006.01)
   B24B 21/00    (2006.01)
   B24B 19/03    (2006.01)
   C03C 19/00    (2006.01)

(52) U.S. Cl.
   CPC .......... *B24B 13/015* (2013.01); *B24B 21/006* (2013.01); *B24D 5/06* (2013.01); *B24D 5/12* (2013.01); *C03C 19/00* (2013.01)

(58) Field of Classification Search
   CPC ....... B24B 19/03; B24B 21/006; C03C 19/00; B24D 5/06; B24D 5/12; B24D 5/123
   See application file for complete search history.

(56) References Cited

U.S. PATENT DOCUMENTS

| | | | |
|---|---|---|---|
| 3,073,690 A * | 1/1963 | Hollis | B24B 19/028 125/11.01 |
| 3,902,277 A * | 9/1975 | Rupp | B24B 13/00 451/123 |
| 4,276,678 A * | 7/1981 | Howe, Jr. | D01G 15/46 19/106 R |
| 4,751,138 A | 6/1988 | Tumey | |
| 4,885,051 A | 12/1989 | Hwang | |
| 4,985,340 A | 1/1991 | Palazzotto | |
| 5,435,816 A | 7/1995 | Spurgeon | |
| 5,454,844 A | 10/1995 | Hibbard | |
| 5,672,097 A | 9/1997 | Hoopman | |
| 5,681,217 A | 10/1997 | Hoopman | |
| 5,851,247 A | 12/1998 | Stoetzel | |
| 5,938,381 A * | 8/1999 | Diehl | B24B 11/00 409/131 |
| 6,139,594 A | 10/2000 | Kincaid | |
| 6,155,778 A * | 12/2000 | Lee | F01D 5/20 415/116 |
| 6,224,469 B1 * | 5/2001 | Ohmori | B24B 53/001 451/443 |
| 6,444,994 B1 * | 9/2002 | Ohmori | B23H 5/08 250/251 |
| 6,722,952 B2 | 4/2004 | Goers et al. | |
| 6,866,560 B1 | 3/2005 | Follstaedt | |
| 7,278,904 B2 | 10/2007 | Woo | |
| 7,524,237 B2 * | 4/2009 | Kim | B23B 27/12 407/119 |
| 7,554,248 B2 | 6/2009 | Oda | |
| 8,077,021 B2 | 12/2011 | Eldering | |
| 8,122,626 B2 | 2/2012 | Schnuckle | |
| 8,251,774 B2 | 8/2012 | Joseph | |
| 8,306,500 B2 | 11/2012 | Tho | |
| 8,460,060 B2 * | 6/2013 | Wilson | B24B 13/00 451/28 |
| 2002/0026752 A1 | 3/2002 | Culler | |
| 2002/0119742 A1 * | 8/2002 | Nakagawa | B24D 5/06 451/542 |
| 2003/0019489 A1 * | 1/2003 | Ogata | B24D 3/34 125/15 |
| 2003/0089364 A1 * | 5/2003 | Kim | B24D 5/123 125/39 |
| 2003/0213483 A1 * | 11/2003 | Sakarcan | B23D 61/025 125/15 |
| 2004/0020244 A1 | 2/2004 | Kramer | |
| 2004/0226429 A1 * | 11/2004 | Voigt | B24D 5/123 83/835 |
| 2005/0188981 A1 * | 9/2005 | Kim | B24D 5/00 125/13.01 |
| 2006/0130823 A1 * | 6/2006 | Kim | B23D 61/023 125/15 |
| 2007/0151554 A1 * | 7/2007 | Song | B23D 61/18 125/15 |
| 2008/0299884 A1 | 12/2008 | Moroto et al. | |
| 2010/0012368 A1 | 1/2010 | Yamamoto | |
| 2010/0123685 A1 | 5/2010 | Lee | |
| 2010/0147279 A1 * | 6/2010 | Baraldi | B23D 61/021 125/15 |
| 2010/0197203 A1 * | 8/2010 | Wilson | B24B 1/00 451/41 |
| 2010/0215451 A1 * | 8/2010 | Jo | B24D 5/123 408/204 |
| 2010/0317267 A1 * | 12/2010 | Soma | B24D 5/06 451/548 |
| 2011/0043477 A1 | 2/2011 | Park | |
| 2011/0050597 A1 | 3/2011 | Park | |
| 2011/0205614 A1 | 8/2011 | Zhao | |
| 2011/0261021 A1 | 10/2011 | Modarres | |
| 2012/0105400 A1 | 5/2012 | Mathew | |
| 2012/0235969 A1 | 9/2012 | Burns | |
| 2012/0249459 A1 | 10/2012 | Sashida | |
| 2012/0262665 A1 | 10/2012 | Boinard | |
| 2012/0270016 A1 | 10/2012 | Hashimoto | |
| 2012/0287057 A1 | 11/2012 | Wei | |
| 2012/0324955 A1 | 12/2012 | Lim | |
| 2012/0329372 A1 | 12/2012 | Tassetti | |
| 2013/0252522 A1 | 9/2013 | Kasashima | |
| 2013/0262665 A1 | 10/2013 | Li | |
| 2014/0030970 A1 * | 1/2014 | Hoang | B24D 5/123 451/542 |
| 2016/0101499 A1 * | 4/2016 | Sventek | B32B 3/02 428/137 |

FOREIGN PATENT DOCUMENTS

| | | |
|---|---|---|
| EP | 1447427 | 8/2004 |
| EP | 2399708 | 12/2011 |
| JP | S58-143958 | 8/1983 |
| JP | S61-19571 | 1/1986 |
| JP | H4-360773 | 12/1992 |
| JP | H7-266235 | 10/1995 |
| JP | H08-1497 | 1/1996 |
| JP | 2004-034246 | 2/2004 |
| JP | 2006-250677 | 9/2006 |
| JP | 2011-51082 | 3/2011 |
| WO | WO 2006/054674 | 5/2006 |
| WO | WO 2011/037333 | 3/2011 |
| WO | WO 2013-090487 | 6/2013 |

OTHER PUBLICATIONS

Happ, "Diffusion depths in silicon measured using cylindrical groves", "Bulletin of the American Physical .Society", Jun. 21, 1956, vol. 1, No. 6, pp. 275, 382.

Hogmark, "Design and evaluation of tribological coatings", Wear, 2000, vol. 246, pp. 20-33.

Hutchings, "Abrasive and erosive wear tests for thin coatings: a unified approach", Tribology International, 1998, vol. 31, Nos. 1-3, pp. 5-15.

(56) References Cited

OTHER PUBLICATIONS

Instruction Manual Model 200 Dimpling Grinder, Fischione Instruments, Inc., 22 pages. XP055140111.
Kassman, "A new test method for the intrinsic abrasion resistance of thin coatings", Surface and Coatings Technology, 1991, vol. 50, pp. 75-84.
Lackner, "Industrially-styled room-temperature pulsed laser deposition of titanium-based coatings", "Vacuum", 2005, vol. 78, pp. 73-82.
Lackner, "Pulsed laser deposition of titanium oxide coatings at room temperature—structural, mechanical and tribological properties", Surface and Coatings Technology, 2004, vol. 180-181, pp. 585-590.
McDonald, "Measurement of the Depth of Diffused Layers in Silicon by the Grooving Method", Journal of Electrochemical Society, Feb. 1962, vol. 109, No. 2, pp. 141-144.
Model 200 Dimpling Grinder, Fischione Instruments, Inc., 11 pages. XP055140113.
O'Regan, "A Low Cost, high efficiency solar cell based on dye-sensitized colloidal $TiO_2$ films", Nature, Oct. 24, 1991, vol. 353, pp. 737-740.
Rutherford, "A micro-abrasive wear test, with particular application to coated systems", Surface and Coatings Technology, 1996, vol. 79, pp. 231-239.
Thompson, "The determination of composition depth profiles using spherical erosion and scanning auger electron spectroscopy", Surface Technology, 1979, vol. 8, pp. 421-428.
International Search Report for PCT International Application No. PCT/US2014/040830 dated Feb. 5, 2015, 7 pages.

\* cited by examiner

METHOD OF FORMING A RECESS IN A SUBSTRATE

TECHNICAL FIELD

The present disclosure relates to methods and materials for forming recesses in a substrate, and covers made therefrom.

BACKGROUND

Forming recesses in planar substrates has been carried out by etching processes, molding processes, and polishing methods using abrasive slurries.

U.S. Pat. Appl. Pub. No. 2012/0270016 A1 (Hashimoto et al.) describes a cover glass for use in a mobile device such as a touch-panel mobile telephone that has a recess that can be recognized as a character or a figure when watching from the front side of the mobile device or a recess that can be recognized when touching from the front side of the mobile device is formed on at least one of opposite main surfaces of the cover glass. A surface of this recess results from a chemical etching process. Such methods can involve hazardous chemicals, be difficult to control, and/or may alter the surface roughness or the chemical composition of the cover glass.

U.S. Pat. Appl. Pub. No. 2012/0287057 A1 (Wei) describes an integrated glass including a solid sculpted area with a number of concave shapes or convex shapes which can be used to form letters, numbers or patterns for user decorating or identifying. The shapes are formed by a process wherein a heated glass preform is pressed against a mold. This energy intensive process involves specialized equipment (e.g., an oven for heating the glass preform), and may not be well-suited for low volume or custom applications where mold fabrication costs may make it uneconomical.

Various dimpling grinders (e.g., a Model 200 Dimpling grinder marketed by E. A. Fischione Instruments, Inc.) have been commercially available. The devices are typically used for the preparation of high quality specimens for transmission electron microscopy (TEM) and as a test for evaluating the wear of coatings. The devices include a vertically oriented rotating wheel that contacts a horizontally rotating stage with the substrate mounted thereto. The wheel itself (which may be, for example, stainless steel, micarta, or wood) does not contain abrasive particles, but is used in combination with a slurry containing abrasive particles in a liquid vehicle. This process is relatively slow, messy, wasteful of abrasive particles, and can lead to distortions in the recess shape, poorer finish and lack of reproducibility.

There is a need for new methods and materials for creating recesses in substrates that overcome some or all of the above disadvantages.

SUMMARY

The present disclosure addresses the above problems by providing methods and materials capable of rapid low tolerance fabrication of recessed features in a substrate such as, e.g., a cover glass. Advantageously, methods according to the present disclosure are also effective to remove material and/or polish the resulting surface in a simple process at a higher rate than slurry polishing methods, with less mess and waste, and with good reproducibility. Surface polishing generally improves the strength of the glass after forming the recess.

In one aspect, the present disclosure provides a method of forming a recess in a surface of a substrate, the method comprising:

providing an abrasive article comprising a structured abrasive member disposed along a peripheral surface of a support member, wherein the structured abrasive member comprises a structured abrasive layer comprising shaped abrasive composites secured to a backing, wherein the backing is proximate to the support member, and wherein the shaped abrasive composites comprise abrasive particles retained in a binder material;

frictionally contacting the structured abrasive layer with the surface of the substrate;

longitudinally advancing the structured abrasive layer relative to the surface of the substrate; and rotating the substrate around a rotational axis perpendicular to the surface of the substrate such that the structured abrasive layer maintains contact with and abrades the surface of the substrate thereby forming the recess therein.

In another aspect, the present disclosure provides an abrasive wheel comprising a structured abrasive member disposed on a peripheral surface of a circular support wheel, wherein the structured abrasive member comprises a structured abrasive layer comprising shaped abrasive composites secured to a backing, wherein the backing is proximate to the support wheel, wherein the structured abrasive member comprises wherein the shaped abrasive composites comprise abrasive particles retained in a binder material, wherein the support wheel has an outer diameter and the structured abrasive member has a substantially uniform width, and wherein the ratio of the width of the structured abrasive member to the outer diameter of the support wheel is less than or equal to 0.125.

The abrasive wheel is useful, for example, for practicing methods according to the present disclosure.

In yet another aspect, the present disclosure provides a cover comprising:

a sheet having first and second opposed major surfaces, wherein the sheet comprises glass, ceramic, or a combination thereof;

a spherically concave recess abutting and extending inwardly from the first major surface, wherein the spherically concave recess has an innermost portion; and a cylindrical passage which extends between and abuts the second major surface and the innermost portion of the spherically concave recess, and wherein the cylindrical passage is perpendicular to the first major surface.

In yet another aspect, the present disclosure provides a cover comprising:

a sheet having first and second opposed major surfaces, wherein the sheet comprises glass, ceramic, or a combination thereof;

a first spherically concave recess abutting and extending inwardly from the first major surface, wherein the first spherically concave recess has a first innermost portion;

a second spherically concave recess abutting and extending inwardly from the second major surface, wherein the second spherically concave recess has a second innermost portion; and a cylindrical passage which extends between and abuts the first and second innermost portions of the first and second spherically concave recess, respectively, and wherein the cylindrical passage is perpendicular to the first major surface.

Covers according to the present disclosure are readily producible using the methods and materials of the present disclosure.

As used herein,

"abrasive composite" refers to a mixture of abrasive particles retained in an organic binder material (typically a crosslinked polymeric material);

"display cover" refers to any transparent material (e.g., glass or sapphire) that is adapted for use as a cover of an electronic display;

"dimple" refers to a recess formed in a surface, wherein the recess has a surface corresponding to a partial surface of a sphere;

"frictionally contacting" means urging into contact with sufficient force that frictional force (e.g., as manifested by a static and/or kinetic coefficient of friction) is established;

"longitudinally advancing" means moving along the direction of travel of the outermost abrasive surface of an abrasive wheel or belt as it abrades a substrate during ordinary use;

"shaped abrasive composite" refers to an abrasive composite that has a predetermined shape that is replicated from a mold cavity used to form the shaped abrasive composite; and "spherically concave surface" means a concavely curved surface in the form of a portion of a sphere.

Features and advantages of the present disclosure will be further understood upon consideration of the detailed description as well as the appended claims.

Figure 1:
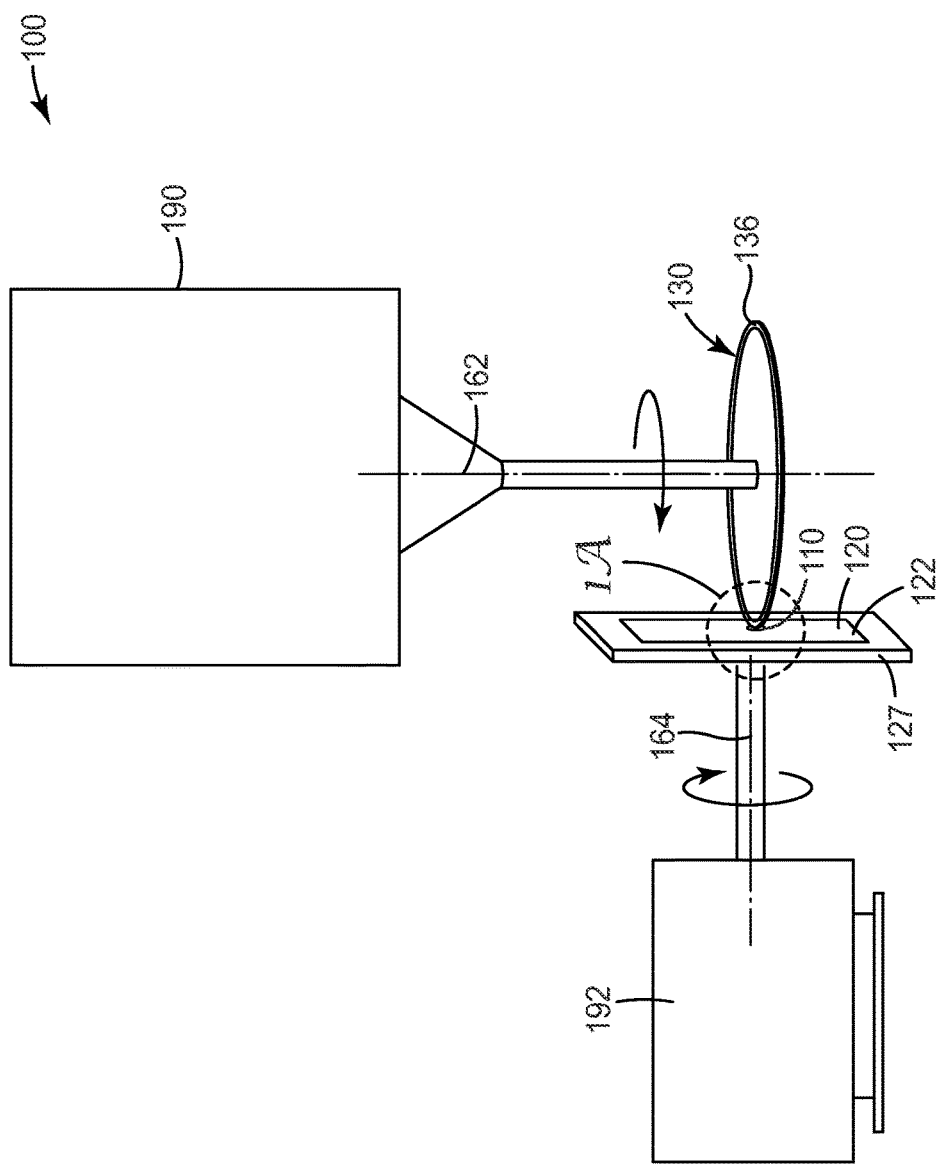
FIG. 1 is a schematic side view of an exemplary configuration for practicing one method according to the present disclosure.

Repeated use of reference characters in the specification and drawings is intended to represent the same or analogous features or elements of the disclosure. It should be understood that numerous other modifications and embodiments can be devised by those skilled in the art, which fall within the scope and spirit of the principles of the disclosure. The figures may not be drawn to scale.

DETAILED DESCRIPTION

Figure 1A:
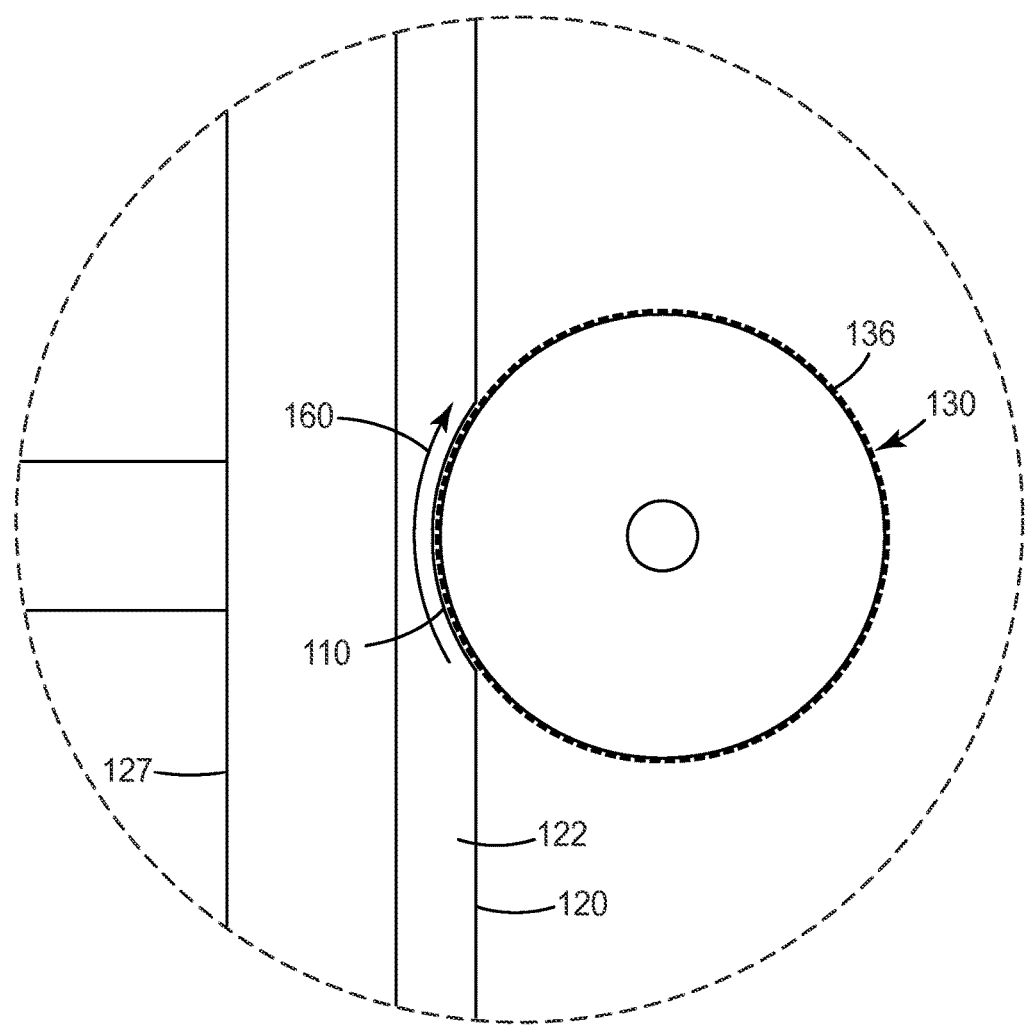
FIG. 1A is an enlarged schematic top view of the region 1A shown in FIG. 1.

FIG. 1 illustrates one exemplary method 100 according to the present disclosure. Referring now to FIG. 1, dimple 110 (an exemplary recess) is formed in substrate 120 as abrasive wheel 130 (see also FIG. 2 and description below) driven by first motor 190 frictionally contacts surface 122 of substrate 120 mounted in holding assembly 127 and driven by second motor 192 is rotated. In the embodiment shown, abrasive wheel 130 rotates about first rotational axis 162. As it rotates, structured abrasive layer 136 of abrasive wheel 130 longitudinally advances along first direction 160 at surface 122 of substrate 120 (see FIG. 1A). Simultaneously, substrate 120 rotates about second rotational axis 164 which is substantially orthogonal to first rotational axis 162. As the process continues, dimple 110 gradually forms, with the size of the dimple being governed by the depth of penetration of the abrasive article into the substrate.

The rate at which abrasion occurs will depend on factors such as frictional contact pressure, abrasive grain size, rotational speed of the abrasive wheel (or abrasive belt), abrasive particle size and hardness, and shape and density of the shaped abrasive composites. Typically, larger harder abrasive particles abraded fastest, but leave a rougher finish than small and/or softer abrasive particles. Accordingly, it may be desirable to carry out the process using a relatively larger and/or harder abrasive particle (e.g., using 3M TRIZACT DIAMOND TILE 677XA 20-micron diamond nominal grade structured abrasive) to rough in the recess, then repeating the process using a smaller and/or softer abrasive particle (e.g., using 3M TRIZACT LAPPING FILM CERIUM OXIDE M-568XA (0.5 micron) structured abrasive) to provide an optically polished finish.

For larger recesses (e.g., dimples larger than about 0.125 inch) a two-step procedure such as that described above is typically preferred. For a smaller recess, a single step may be sufficiently fast to achieve a fine surface finish can be achieved in a single application of the method (e.g., using ceria abrasive).

Figure 2:
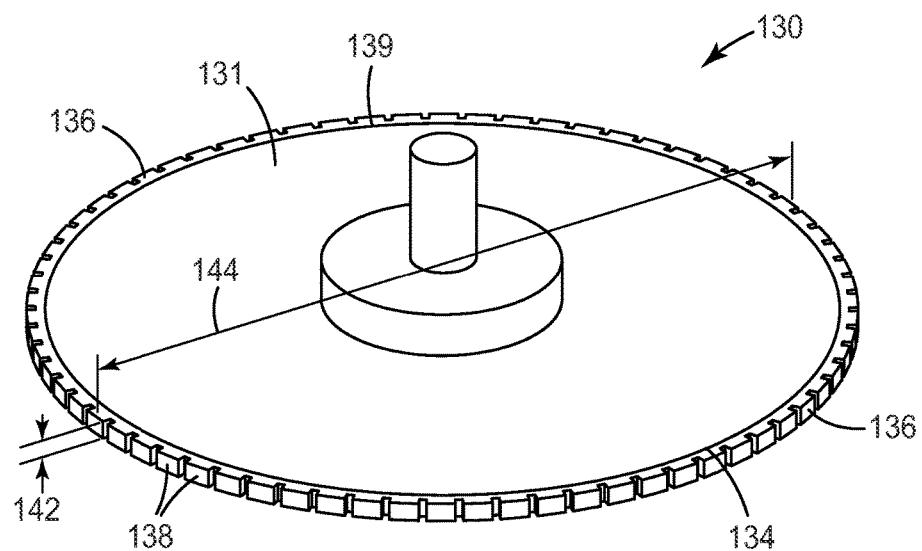
FIG. 2 is a schematic perspective view of a structured abrasive wheel suitable for practicing the present disclosure.
Figure 2A:
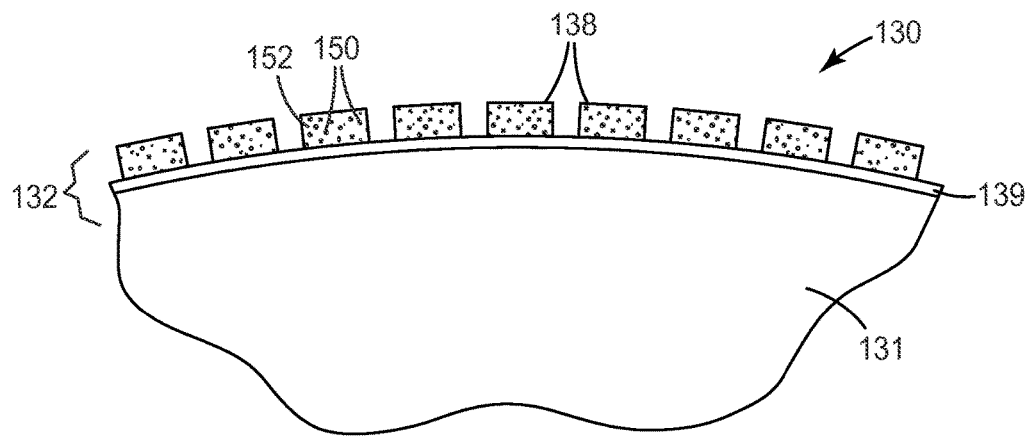
FIG. 2A is an enlarged schematic top view of a portion of abrasive wheel 130 in FIG. 2.

Referring now to FIGS. 2 and 2A, exemplary abrasive wheel 130 comprises structured abrasive member 132 disposed along the peripheral surface 134 of support wheel 131. Structured abrasive member 132 comprises structured abrasive layer 136 secured to backing 139. Structured abrasive layer 136 comprises shaped abrasive composites 138 comprising abrasive particles 150 retained in organic binder material 152. Structured abrasive layer 136 has substantially uniform width 142. To be useful for forming high quality dimples, support wheel 131 has diameter 144. The ratio of width 142 to diameter 144 is less than or equal to 0.125.

Advantageously, methods according to the present disclosure can be carried out in the absence of added loose abrasive particles and/or added abrasive slurry comprising the abrasive particles in a liquid vehicle, although this is not a requirement. This generally results in reduced mess and waste, and provides sharper edge definition where the recess contacts the surrounding surface of the substrate.

The abrasive article may comprise, for example, an abrasive wheel (e.g., as shown in FIGS. 1 and 2) or an abrasive belt. Preferably, the width of the support member should be about the same as the width of the structured abrasive layer that is mounted to its outer peripheral surface, although this is not a requirement. The abrasive article is generally driven by a motor although manual power may also be used.

Preferably, the structured abrasive layer is longitudinally advanced around an axis of rotation where it is in frictional contact with the surface of the substrate. This is inherently achieved in the case that the abrasive article is an abrasive wheel, and also corresponds to travel of an abrasive belt around a wheel (e.g., a drive wheel or a guide wheel). In such embodiments, the axes of rotation of the abrasive article and the surface of the substrate should not be parallel. In some embodiments, they are substantially orthogonal; however, this is not a requirement.

To form a dimple in the substrate, the area of frictional contact between the abrasive article and the substrate generally includes a point on the rotational axis of the substrate which corresponds to the deepest point of the dimple.

In other embodiments, the area of frictional contact between the abrasive article and the substrate can be moved relative to the rotational axis of the substrate. For example, if the surface of the substrate rotates about a first rotational axis, and an abrasive wheel rotates about a second rotational axis (i.e., not parallel to the first rotational axis), the abrasive wheel and/or substrate may be translated along a third different direction in a plane parallel to the surface of the substrate. Such motion will generally result in a groove having a surface shaped as a portion of a cylinder with spherically rounded ends.

In yet further embodiments, the area of frictional contact between the abrasive article and the substrate may be offset from the rotational axis of the substrate. For example, if the surface of the substrate rotates about a first rotational axis that is laterally offset from the area of frictional contact, and an abrasive wheel rotates about a second rotational axis (i.e., not parallel to the first rotational axis), the method will generally result in a ring-shaped recess having a surface corresponding to a portion of a torus.

In practice of methods according to the present disclosure, frictional contact is established between the abrasive article and the surface of the substrate, resulting over time in the abrasive article penetrating into the substrate. Abrasion of the substrate and formation of the recess is thus achieved by applying a level of force to the abrasive article and/or substrate that urges them toward each other in combination with other motion(s) of the abrasive article and substrate. Selection of an appropriate amount of applied force is within the capabilities of one of ordinary skill in the art. Preferably, the force is sufficient to achieve a good rate of abrasion, but not so high that stiction occurs.

In some embodiments, the abrasive article is aligned perpendicularly to the surface of the substrate while abrading the substrate. In some embodiments, the abrasive article may be inclined at an angle of at less than 90, 80, 70, 60, 50, 40, 30, or even at less than 20 degrees relative to the surface of the substrate.

During abrading of the substrate, an abrading liquid may be used to reduce heat buildup and/or carry away debris. Abrading liquids include, for example, water, water containing one or more surfactants (e.g., as described in U.S. Pat. No. 7,278,904 B2 (Woo et al.)), oil, glycol, or other lubricant.

The substrate may comprise any shape. In some embodiments, the substrate has a substantially planar surface, while in other embodiments the surface may be convex, concave, planar, or a combination thereof. Examples of suitable substrate shapes include sheets, blocks, wafers, and slabs. The substrate may comprise any material, but preferably the substrate (and especially the substrate surface to be abraded) comprises at least one of a glass, ceramic, or glass-ceramic material. Examples of suitable glasses include soda-lime silica glasses, borosilicate glasses, fluoride glasses, aluminosilicate glasses (e.g., phosphate glasses, borate glasses, and chalcogenide glasses) and chemically-strengthened glasses (e.g., corresponding to ion-exchanged alkali-containing glasses such as soda lime silicates, alkali boroaluminosilicates, and alkali aluminosilicates (e.g., including those marketed under the trade designation "GORILLA GLASS" by Corning, Corning, N.Y.)). Examples of suitable ceramics include alumina, sapphire, ruby, zirconia, yttria and/or rare-earth oxide containing glass-ceramics, and combinations thereof. In preferred embodiments, the substrate is transparent, although this is not a requirement. In some of those embodiments, the substrate is preferably substantially colorless. In some embodiments, the substrate comprises metal or a metal alloy.

Advantageously, methods according to the present disclosure can create a variety of recesses including, for example, dimples, ellipsoidal recesses (i.e., having surface shaped as a portion of an ellipsoid), troughs, and rings (e.g., depressed rings or grooves having a surface shaped as a section of a torus). In typical embodiments, the recess has a smooth continuously concave surface, although this is not a requirement. Also, in typical embodiments, the recess terminates abruptly at a well-defined boundary where is abuts the surface of the substrate, although this is not a requirement. These characteristics of the recess make the method well-suited for preparing covers (e.g., display covers adapted for tactile interaction using a finger or stylus).

Methods according to the present disclosure may be used to form recesses with complex shapes in covers such as, for example, display covers, medical device covers, and/or sensor apparatus covers. For example, a dimple may be formed that is centered over a cylindrical hole (i.e., via) extending through the substrate. In such an instance, it is typically preferred to form the cylindrical hole (e.g., by boring) prior to practicing one or more methods according to the present disclosure. By so doing, chips that may be formed by boring are removed during the abrading process.

Figure 3:
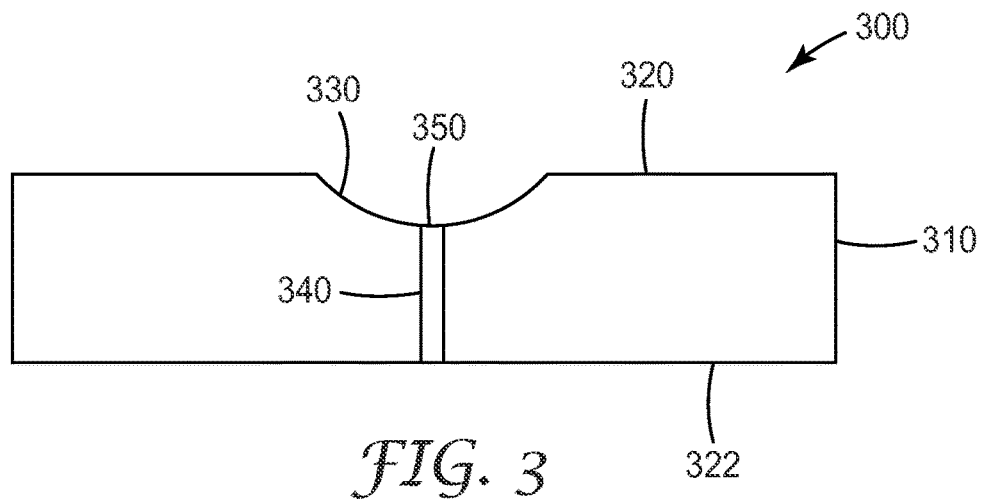
FIG. 3 is a schematic side view of an exemplary cover according to the present disclosure.

Referring now to FIG. 3, cover 300 comprises chemically-strengthened glass sheet 310 which has first and second opposed parallel major surfaces 320, 322. Spherically concave recess 330 abuts and extends inwardly from first major surface 320. At its deepest point 350, spherically concave recess 330 abuts cylindrical passage 340 which extends between and abuts spherically concave recess 330 and second major surface 322. Cylindrical passage 340 is perpendicular to first and second opposed parallel major surfaces 320, 322.

Figure 4:
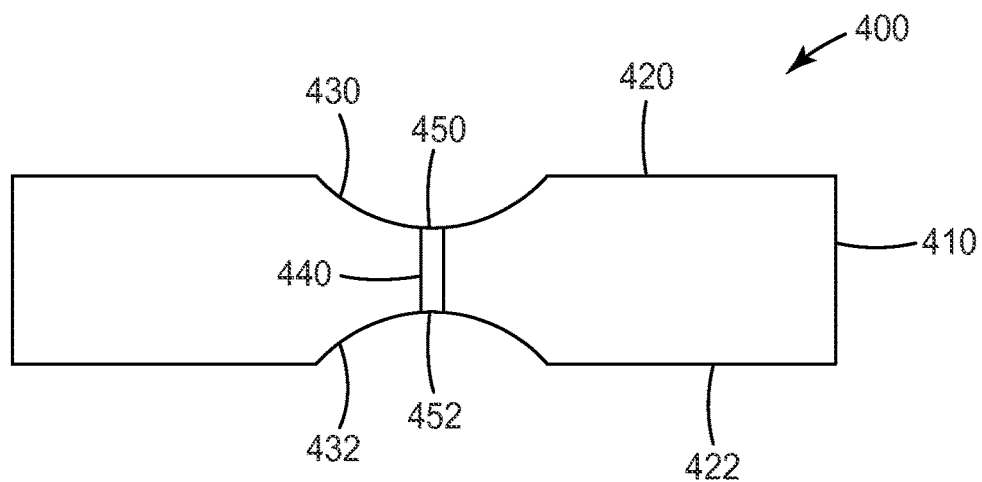
FIG. 4 is a schematic side view of another exemplary cover according to the present disclosure.

Referring now to FIG. 4, display cover 400 comprises sapphire sheet 410 which has first and second opposed parallel major surfaces 420, 422. First spherically concave recess 430 abuts and extends inwardly from first major surface 420. Second spherically concave recess 432 abuts and extends inwardly from second major surface 440. Cylindrical passage 440, which extends between and abuts first and second spherically concave recesses 430, 432 at their deepest points 450, 452, is perpendicular to first and second opposed parallel major surfaces 420, 422.

Recesses such as those shown in FIGS. 3 and 4 may be useful for fabrication as a component in the fabrication of interactive elements proximate to the display cover.

In the course of development of the methods of the present disclosure, the present inventors developed abrasive articles and methods for making them that were adapted to use with methods of the present disclosure. These will now be discussed in detail.

Abrasive wheels and abrasive belts useful for practicing the present disclosure may be formed using structured abrasives such as, for example, structured abrasive member 132 in FIG. 2A. In one method strips of structured abrasive are adhered to the peripheral surface (i.e., edge) of a support wheel (typically fitted with a suitable mechanical fastening system to connect to a drive source). Examples of suitable adhesives include glues, pressure-sensitive adhesives and epoxy resins, although any material capable of making a secure bond may be used.

While in FIG. 2A, structured abrasive member 132 is secured to a support wheel, by omitting the support wheel, a structured abrasive belt can be made, for example, according to well-known techniques.

Suitable structured abrasives have a structured abrasive layer secured to a major surface of a backing. Suitable backings typically have a front surface and a back surface. Representative examples of materials useful for preparing backings include polymeric films (including primed polymeric films), compressible resilient foams (e.g., elastomeric foams), woven fabrics, knit fabrics, nonwoven fabrics, and combinations thereof. For use in abrasive wheels the backing preferably comprises a polymeric film. For use in abrasive belt the backing should have sufficient dimensional stability and durability, and preferably comprises a woven or knit material. Film backings can be used and may include adhesion promoters or anti slip coatings. In some preferred embodiments, the backing can be a polyethylene terephthalate film having a thickness of from about 2 to 8 mils (50 to 200 microns).

The backing can be transmissive or opaque to ultraviolet or visible radiation, or transmissive or opaque to both ultraviolet and visible radiation, although this is not a requirement. The backing may also be subjected to a treatment or treatments to seal the backing or modify some physical properties of the backing, or both. These treatments are well-known in the art. For example, cloth backings may contain a saturant coat, a backsize coat, a presize coat, or any combination thereof. The saturant coat saturates the backing and fills in the small openings in the backing. The backsize coat, which is applied to the backside of the backing, can protect the fibers or yarns during use. The presize coat is applied to the front side of the backing. The presize coat on the front side of the cloth functions to seal the cloth. Examples of resins useful for treating cloth include phenolics, latexes, epoxies, acrylates, acrylated epoxies, acrylated urethanes, polyesters, starches, and combinations thereof. The resins for treating cloth may further comprise additives, such as, for example, fillers, fibers, coupling agents, wetting agents, dyes, and pigments.

The structured abrasive layer may be formed on the backing by filling cavities in a production tool with a mixture of abrasive particles and a curable binder precursor, contacting the backing with the production tool and binder precursor and then sufficiently curing the binder precursor that separation of the backing from the production tool causes the shaped abrasive composites formed in the production tool to remain secured to the backing, thereby forming a structured abrasive layer.

The structured abrasive layer is secured to the backing such that it does not separate from the backing during intended use. The shaped abrasive composites may have any shape, but typically comprise pyramids (e.g., 3- or 4-sided pyramids), truncated pyramids (e.g., 3- or 4-sided truncated pyramids), prisms (e.g., 3-, 4-, or 6-sided prisms), rods, cones, truncated cones, and combinations thereof. Combinations of differently shaped abrasive composites and/or different heights of shaped abrasive composites may be used. For example, pyramidal shaped abrasive composites may be interspersed with truncated pyramidal shaped abrasive composites of lesser height. The shaped abrasive composites may be regular (having all sides identical) or irregular.

In some embodiments, the shaped abrasive composites may be precisely-shaped abrasive composites. This means that the shape of the shaped abrasive composites is defined by relatively smooth surfaced sides that are bounded and joined by well-defined edges having distinct edge lengths with distinct endpoints defined by the intersections of the various sides. The terms "bounded" and "boundary" refer to the exposed surfaces and edges of each composite that delimit and define the actual three-dimensional shape of each abrasive composite. These boundaries are readily visible and discernible when a cross-section of an abrasive article is viewed under a scanning electron microscope. These boundaries separate and distinguish one precisely-shaped abrasive composite from another even if the abrasive composites abut each other along a common border at their bases. By comparison, in a shaped abrasive composite that does not have a precise shape, the boundaries and edges are not well defined (e.g., where the shaped abrasive composite sags before completion of its curing).

The shaped abrasive composites define the structured abrasive layer and are typically arranged in close-packed arrangements (e.g., arrays) wherein adjacent shaped abrasive composites contact one another at their respective bases, although separation between at least some adjacent shaped abrasive composites is permissible. Gaps (e.g., stripes) in the topographically structured abrasive layer may be present.

The height of the shaped abrasive composites relative to the backing is typically in a range of from 10 to 900 microns, although greater or lesser heights may also be used. More typically, the height of the shaped abrasive composites relative to the backing is in a range of from 50 to 850 microns, or even in a range of from 75 microns to 800 microns.

In some embodiments, the areal density of the shaped abrasive composites in the topographically structured abrasive layer is typically in a range of from at least 1,000, 10,000, or even at least 20,000 abrasive composites per square inch (e.g., at least 150, 1,500, or even 7,800 abrasive composites per square centimeter) up to and including 50,000, 70,000, or even as many as 100,000 abrasive composites per square inch (up to and including 7,800, 11,000, or even as many as 15,000 abrasive composites per square centimeter), although greater or lesser densities of abrasive composites may also be used.

The shaped abrasive composites (whether pyramidal or truncated pyramidal) may also comprise diluent particles, typically with sizes on the same order of magnitude as the abrasive particles. Examples of such diluent particles include gypsum, marble, limestone, flint, silica, glass bubbles, glass beads, and aluminum silicate.

The mixture to be used to form abrasive composites comprises a plurality of abrasive particles dispersed in a binder precursor. As used herein, the term "mixture" means any composition comprising a plurality of abrasive particles dispersed in a binder precursor. It is preferred that the mixture be flowable. However, if the mixture is not flowable, it can be extruded or forced by other means (e.g., heat, pressure, or both) onto the contacting surface of the production tool or onto the front surface of the backing. The mixture can be characterized as being conformable, that is, it can be forced to take on the same shape, outline, or contour as the contacting surface of the production tool and the front surface of the backing.

The abrasive particles typically have a size ranging from about 0.1 to 100 microns, preferably from about 0.2 to 50 microns, and more preferably from 0.5 to 45 microns, although other sizes may also be used. Examples of abrasive particles suitable for use in structured abrasives according to the present disclosure include fused aluminum oxide, ceramic aluminum oxide, heat treated aluminum oxide, white aluminum oxide, green silicon carbide, silicon carbide, alumina, zirconia, diamond, ceria, cubic boron nitride, garnet, silica, and combinations thereof. The phrase "abrasive particles" includes both individual abrasive grits and a plurality of individual abrasive grits bonded together to form an agglomerate. The abrasive particles may have a surface treatment thereon. In some instances, the surface treatment may increase adhesion to the binder, alter the abrading characteristics of the abrasive particle, or the like. Examples of surface treatments include coupling agents (e.g., silane coupling agents), halide salts, metal oxides including silica, refractory metal nitrides, and refractory metal carbides.

The binder precursor is capable of being cured by energy, preferably radiation energy, more preferably, radiation energy from ultraviolet light, visible light, or electron beam sources. Other sources of energy include infrared, thermal, and microwave. It is preferred that the energy not adversely affect the production tool used in the method of the invention, so that the tool can be reused. The binder precursor can polymerize via a free radical mechanism or a cationic mechanism. Examples of binder precursors that are capable of being polymerized by exposure to radiation energy include acrylated urethanes, acrylated epoxies, ethylenically unsaturated compounds, aminoplast derivatives having pendant unsaturated carbonyl groups, isocyanurate derivatives having at least one pendant acrylate group, isocyanate derivatives having at least one pendant (meth)acrylate group, vinyl ethers, epoxy resins, and combinations thereof. As used herein, the term "(meth)acrylate" refers to acrylates and/or methacrylates.

If either ultraviolet radiation or visible radiation is to be used, it is preferred that the binder precursor further comprise free-radical photoinitiator and/or cationic photocatalyst to facilitate curing of the binder precursor. Examples of free-radical photoinitiators include organic peroxides, azo compounds, quinones, benzophenones, nitroso compounds, acyl halides, hydrazones, mercapto compounds, pyrylium compounds, bisimidazoles, phosphine oxides, chloroalkyltriazines, benzoin ethers, benzil ketals, thioxanthones, acetophenone derivatives, sensitized iodonium salts, and combinations thereof.

Cationic photocatalysts generate an acid source, e.g., to initiate the polymerization of an epoxy resin. Cationic photocatalysts can include a salt having an onium cation and a halogen containing a complex anion of a metal or metalloid. Other cationic photocatalysts include a salt having an organometallic complex cation and a halogen containing complex anion of a metal or metalloid. Cationic photocatalysts are further described in U.S. Pat. No. 4,751,138 (Tumey et al.) and U.S. Pat. No. 4,985,340 (Palazzotto et al.).

In addition to the radiation curable resins, the binder precursor may further comprise resins that are curable by sources of energy other than radiation energy, such as condensation curable resins. Examples of such condensation curable resins include phenolic resins, melamine-formaldehyde resins, and urea-formaldehyde resins.

The binder precursor can further comprise optional additives, such as, for example, fillers (including grinding aids), fibers, lubricants, wetting agents, surfactants, pigments, dyes, coupling agents, plasticizers, and suspending agents. The amounts of these materials can be adjusted to provide the properties desired. Examples of fillers include calcium carbonate, silica, quartz, aluminum sulfate, clay, dolomite, calcium metasilicate, and combinations thereof. Examples of grinding aids include potassium tetrafluoroborate, cryolite, sulfur, iron pyrites, graphite, sodium chloride, and combinations thereof. The mixture can contain up to 70 weight percent (wt. %) filler or grinding aid, typically up to 40 wt. %, preferably from 1 to 10 wt. %, and more preferably from 1 to 5 wt. %.

The mixture can be prepared by mixing the ingredients, preferably by a low shear mixer. A high shear mixer can also be used. Typically, the abrasive particles are gradually added into the binder precursor. Additionally, it is possible to minimize the amount of air bubbles in the mixture. This can be accomplished by pulling a vacuum during the mixing step.

During manufacture, radiation energy is typically transmitted through the production tool and into the mixture to at least partially cure the binder precursor. The phrase "partial cure" means that the binder precursor is polymerized to such a state that the resulting mixture releases from the production tool. The binder precursor can be fully cured once it is removed from the production tool by any energy source, such as, for example, thermal energy or radiation energy. The binder precursor can also be fully cured before the shaped abrasive composites are removed from the production tool.

Sources of radiation energy preferred for structured abrasives according to the present disclosure include electron beam, ultraviolet light, and visible light. Other sources of radiation energy include infrared and microwave. Thermal energy can also be used. Electron beam radiation, which is also known as ionizing radiation, can be used at a dosage of about 2 to 25 megarads (Mrad), preferably at a dosage of about 10 to 20 Mrad. Ultraviolet radiation refers to non-particulate radiation having a wavelength within the range of about 200 to about 400 nanometers, preferably within the range of about 250 to 400 nanometers. It is preferred that ultraviolet radiation be provided by ultraviolet lights. Visible radiation refers to non-particulate radiation having a wavelength within the range of about 400 to about 800 nanometers, preferably within the range of about 400 to about 550 nanometers.

If the radiation energy is transmitted through the production tool and directly into the mixture, it is preferred that the material from which the production tool is made not absorb an appreciable amount of the radiation energy or be degraded by it. For example, if electron beam energy is used, it is preferred that the production tool not be made from a cellulosic material, because the electrons will degrade the cellulose. If ultraviolet radiation or visible radiation is used, the production tool material should transmit sufficient ultraviolet or visible radiation, respectively, to bring about the desired level of cure.

The production tool should be operated at a velocity that is sufficient to avoid degradation by the source of radiation. Production tools that have relatively high resistance to degradation by the source of radiation can be operated at relatively lower velocities; production tools that have relatively low resistance to degradation by the source of radiation can be operated at relatively higher velocities. In short, the appropriate velocity for the production tool depends on the material from which the production tool is made.

The production tool can be in the form of a belt, e.g., an endless belt, a sheet, a continuous sheet or web, a coating roll, a sleeve mounted on a coating roll, or die. The surface of the production tool that will come into contact with the mixture can be smooth or can have a topography or pattern. This surface is referred to herein as the "contacting surface". If the production tool is in the form of a belt, sheet, web, or sleeve, it will have a contacting surface and a non-contacting surface. If the production tool is in the form of a roll, it will have a contacting surface only. The topography of the abrasive article formed by the method of structured abrasives according to the present disclosure will have the inverse of the pattern of the contacting surface of the production tool. The pattern of the contacting surface of the production tool will generally be characterized by a plurality of cavities or recesses. The opening of these cavities can have any shape such as for example, a regular or irregular rectangle, semicircle, circle, triangle, square, hexagon, or octagon. The walls of the cavities can be vertical or tapered. The pattern formed by the cavities can be arranged according to a specified plan or can be random. The cavities can butt up against one another.

Thermoplastic materials that can be used to construct the production tool include polyesters, polycarbonates, poly (ether sulfone), poly(methyl methacrylate), polyurethanes, polyvinylchloride, polyolefins, polystyrene, or combinations thereof. Thermoplastic materials can include additives such as plasticizers, free radical scavengers or stabilizers, thermal stabilizers, antioxidants, and ultraviolet radiation absorbers.

A thermoplastic production tool can be made, for example, according to the following procedure. A master tool is first provided. The master tool is preferably made from metal, e.g., nickel. The master tool can be fabricated by any conventional technique, such as engraving, hobbing, knurling, electroforming, diamond turning, or laser machining. The master tool should have the inverse of the pattern desired for the surface of the production tool. The thermoplastic material can be embossed with the master tool to form the pattern. Embossing can be conducted while the thermoplastic material is in a flowable state. After being embossed, the thermoplastic material can be cooled to bring about solidification.

The production tool can also be made of a cured thermosetting resin. A production tool made of thermosetting material can be made according to the following procedure. An uncured thermosetting resin is applied to a master tool of the type described previously. While the uncured resin is on the surface of the master tool, it can be cured or polymerized by heating such that it will set to have the inverse shape of the pattern of the surface of the master tool. Then, the cured thermosetting resin is removed from the surface of the master tool. The production tool can be made of a cured radiation curable resin, such as, for example acrylated urethane oligomers. Radiation cured production tools are made in the same manner as production tools made of thermosetting resin, with the exception that curing is conducted by means of exposure to radiation (e.g., ultraviolet radiation).

The contacting surface of the production tool may also contain a release coating to permit easier release of the abrasive article from the production tool. Examples of such release coatings include silicones and fluorochemicals.

Further details concerning materials and methods for making structured abrasive layers secured to backings can be found in, for example, U.S. Pat. No. 5,435,816 (Spurgeon et al.); U.S. Pat. No. 5,672,097 (Hoopman); U.S. Pat. No. 5,681,217 (Hoopman et al.); U.S. Pat. No. 5,454,844 (Hibbard et al.); U.S. Pat. No. 5,851,247 (Stoetzel et al.); U.S. Pat. No. 6,139,594 (Kincaid et al.); and U.S. Pat. No. 8,251,774 B2 (Joseph et al.).

Various suitable structured abrasives are commercially available, for example, under the trade designation "TRIZACT" from 3M Company, Saint Paul, Minn. Examples include: 3M TRIZACT LAPPING FILM 162XA (46 micron nominal grade, Mohs hardness <3); 3M TRIZACT LAPPING FILM ALUMINUM OXIDE 268XA (available in 5, 10, 20, and 35 micron nominal grades); 3M TRIZACT LAPPING FILM CERIUM OXIDE M-568XA (0.5 micron nominal grade); 3M TRIZACT DIAMOND LAPPING FILM (available in 0.5, 2, and 9 micron diamond nominal grades); 3M TRIZACT DIAMOND TILE 677XA structured abrasive sheets (available in 3, 6, 9, and 20 micron diamond nominal grades). The structured abrasive thus prepared may be then converted into an abrasive belt according to known methods. It may also be secured to the peripheral surface of a support wheel to form an abrasive wheel.

Preferably, the width of the structured abrasive layer is less than or equal to about $\frac{1}{8}$th (12.5 percent), less than $\frac{1}{10}$th (10 percent), or even less than $\frac{1}{20}$th (5 percent) of the diameter of the abrasive article (e.g., in the case of a wheel) and/or the size and shape of the desired recess (e.g., the diameter of a dimple or the width (i.e., width not diameter) of a ring). Typically, the selection of the width of the structured abrasive layer and the diameter of the wheel will be dictated by the specific application, and will be determined by the size of the dimple, and the precision and speed of the abrading process.

SELECT EMBODIMENTS OF THE PRESENT DISCLOSURE

In a first embodiment, the present disclosure provides a method of forming a recess in a surface of a substrate, the method comprising:

providing an abrasive article comprising a structured abrasive member disposed along a peripheral surface of a support member, wherein the structured abrasive member comprises a structured abrasive layer comprising shaped abrasive composites secured to a backing, wherein the backing is proximate to the support member, and wherein the shaped abrasive composites comprise abrasive particles retained in a binder material;

frictionally contacting the structured abrasive layer with the surface of the substrate, wherein the surface of the substrate is substantially planar;

longitudinally advancing the structured abrasive layer relative to the surface of the substrate; and rotating the substrate around a rotational axis perpendicular to the surface of the substrate such that the structured abrasive layer maintains contact with and abrades the surface of the substrate thereby forming the recess therein.

In a second embodiment, the present disclosure provides a method according to the first embodiment, wherein the method is carried out in the absence of added loose abrasive particles or abrasive slurry.

In a third embodiment, the present disclosure provides a method according to the first or second embodiment, wherein the abrasive article comprises an abrasive wheel or an abrasive belt.

In a fourth embodiment, the present disclosure provides a method according to any one of the first to third embodiments, wherein the abrasive particles comprise at least one of cerium oxide or diamond.

In a fifth embodiment, the present disclosure provides a method according to any one of the first to fourth embodiments, wherein the recess comprises a dimple.

In a sixth embodiment, the present disclosure provides a method according to any one of the first to fifth embodiments, wherein the recess comprises a ring.

In a seventh embodiment, the present disclosure provides a method according to any one of the first to sixth embodiments, wherein the substrate has a cylindrical passage extending therethrough perpendicular to the surface of the substrate, and wherein the rotational axis is collinear with the cylindrical passage.

In an eighth embodiment, the present disclosure provides a method according to any one of the first to seventh embodiments, wherein the recess has a continuously concave surface.

In a ninth embodiment, the present disclosure provides a method according to any one of the first to eight embodiments, wherein said moving at least one of the abrasive article and the substrate relative to the other comprises rotating the substrate.

In a tenth embodiment, the present disclosure provides a method according to any one of the first to ninth embodiments, wherein the substrate is selected from the group consisting of a glass sheet and a sapphire sheet.

In an eleventh embodiment, the present disclosure provides an abrasive wheel comprising a structured abrasive member disposed on a peripheral surface of a circular support wheel, wherein the structured abrasive member comprises a structured abrasive layer comprising shaped abrasive composites secured to a backing, wherein the backing is proximate to the support wheel, wherein the shaped abrasive composites comprise abrasive particles retained in a binder material, wherein the support wheel has an outer diameter and the structured abrasive member has a substantially uniform width, and wherein the ratio of the width of the structured abrasive member to the outer diameter of the support wheel is less than or equal to 0.125.

In a twelfth embodiment, the present disclosure provides an abrasive wheel according to the eleventh embodiment, wherein the peripheral surface of the support wheel is substantially covered by the structured abrasive layer.

In a thirteenth embodiment, the present disclosure provides a sheet having first and second opposed major surfaces, wherein the sheet comprises glass, ceramic, or a combination thereof;

a spherically concave recess abutting and extending inwardly from the first major surface, wherein the spherically concave recess has an innermost portion; and a cylindrical passage which extends between and abuts the second major surface and the innermost portion of the spherically concave recess, and wherein the cylindrical passage is perpendicular to the first major surface.

In a fourteenth embodiment, the present disclosure provides a cover comprising:

a sheet having first and second opposed major surfaces, wherein the sheet comprises glass, ceramic, or a combination thereof;

a first spherically concave recess abutting and extending inwardly from the first major surface, wherein the first spherically concave recess has a first innermost portion;

a second spherically concave recess abutting and extending inwardly from the second major surface, wherein the second spherically concave recess has a second innermost portion; and a cylindrical passage which extends between and abuts the first and second innermost portions of the first and second spherically concave recess, respectively, and wherein the cylindrical passage is perpendicular to the first major surface.

In a fifteenth embodiment, the present disclosure provides a cover comprising:

a sheet having first and second opposed major surfaces, wherein the sheet comprises glass, ceramic, or a combination thereof; and a spherically concave recess abutting and extending inwardly from the first major surface, wherein the spherically concave recess has an innermost portion.

Objects and advantages of this disclosure are further illustrated by the following non-limiting examples, but the particular materials and amounts thereof recited in these examples, as well as other conditions and details, should not be construed to unduly limit this disclosure.

EXAMPLES

Unless otherwise noted, all parts, percentages, ratios, etc. in the Examples and the rest of the specification are by weight.

Test Methods

Profilometry

Contact profilometry was conducted using a P16+ stylus profiler, available from KLA-Tencor Corporation, Milpitas Calif. The scan length was 8.0 mm and the scan rate was 100 μm/s. The load on the stylus was 0.5 mg and the stylus tip radius was 0.15 μm.

Example 1

This example describes the preparation of an abrasive wheel according to the present disclosure. A sheet of 3M TRIZACT 568XA ceria abrasive, available from the 3M Company, St. Paul, Minn., was cut into a strip 0.045 inch (0.11 cm) wide and 12 inches (30.5 cm) long. 3M SCOTCH-WELD instant adhesive, available from the 3M Company was applied to the back side of an end of the abrasive strip, covering about 0.5 inch (1.3 cm) length of the strip. The back side of the abrasive strip with adhesive was brought into contact with the outer peripheral surface of an 88 mm diameter×0.1 in (0.25 cm) thick metal support member having an integral central shaft. The adhesive was allowed to cure. Additional adhesive was applied to the backside of the abrasive strip in about 0.5 inch (1.3 cm) lengths. The adhesive with abrasive was brought into contact with the outer peripheral surface of the support member. This process was continued until the entire peripheral surface of the support member was covered with abrasive. Before securing the last section of the abrasive surface to the peripheral surface, the abrasive strip was cut to the appropriate length, so that the last section of the abrasive strip did not overlap with the first section of the abrasive strip attached to support member. The adhesive was allowed to cure, producing an abrasive wheel.

Example 2

This example describes a single-step lapping method for fabricating a dimple according to the present disclosure. The abrasive wheel produced in Example 1 was mounted in the chuck of a rotatable drive such that the major surfaces of the wheel were parallel to the ground. A soda-lime glass plate, 2 in (5.1 cm)×3 in (7.6 cm)×0.12 cm was mounted on the rotatable fixture of a FIBERMET optical fiber polisher, model #69-3000-160, available from Buehler, Lake Bluff, Ill. Prior to mounting the glass plate to the fixture, a rubber sheet, about 2 in (5.1 cm)×3 in (7.6 cm)×1 mm was mounted on the face of the fixture using double side adhesive tape. The glass plate was mounted to the rubber sheet using double sided adhesive tape. The major surface of the fixture (i.e., the surface the glass plate was mounted to) was perpendicular to the ground. The polisher was mounted on a programmable x-y stage, such that it could traverse. The stage with polisher was positioned adjacent to the abrasive wheel, such that, the peripheral surface of the abrasive wheel could contact the center axis of the rotatable fixture of the polisher. The abrasive wheel was rotated at 1,000 rpm and the glass plate was rotated at 150 rpm. The polisher was traversed, via the x-y stage, such that, the rotational axis of the mounted glass plate contacted the leading edge of the rotating abrasive wheel. Prior to contact, a coolant, water at 8 ml/min, was flowed onto the edge of the rotating wheel directly adjacent to the glass plate. The polisher was continuously traversed into the edge of the abrasive wheel at a rate of 12 µm/min. Traversing of the polisher was continued for 4 minutes, at which time the polisher was left in a stationary position and lapping was continued for an additional 30 seconds. At this time, rotation of both the glass plate and abrasive wheel was stopped. The glass was removed from the polisher. A profilometer scan, per the above test method, was conducted across the lapped region of the glass plate and the glass plate was observed to have a hemispherical recess of about 48 µm in depth with a diameter of about 4.5 mm.

Example 3

This example describes the preparation of an abrasive wheel according to the present disclosure. An abrasive wheel was prepared using the same procedure as Example 1, except that the 3M TRIZACT 568XA ceria abrasive sheet was replaced with a sheet of 3M TRIZACT DIAMOND TILE 677XA 20 µm abrasive, available from the 3M Company, and the abrasive sheet was cut into a strip 0.100 in (0.25 cm) wide and 12 inches (30.5 cm) long, producing an abrasive wheel.

Example 4

This example describes the preparation of an abrasive wheel according to the present disclosure. An abrasive wheel was prepared using the same procedure as Example 1, except that the 3M TRIZACT 568XA ceria abrasive was cut into a strip 0.075 in (0.19 cm) wide and 12 inches (30.5 cm) long, producing an abrasive wheel.

Example 5

Figure 5:
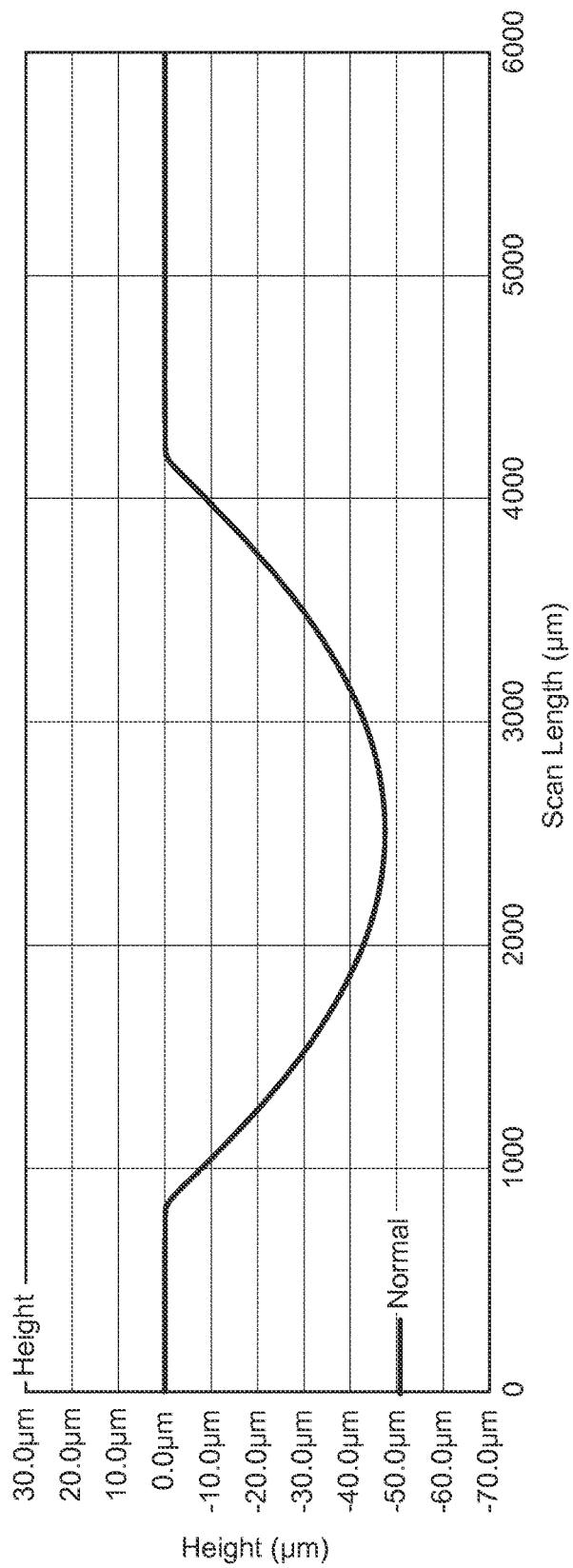
FIG. 5 is a surface profile of a dimple generated according to Example 2.

This example describes a two-step lapping method for fabricating a dimple according to the present disclosure. The equipment, equipment configuration, and general lapping procedure described in Example 2 was used for the two-step lapping process. The abrasive wheel produced in Example 3 was mounted in the chuck of the rotatable drive. A soda-lime glass plate, 2 in (5.1 cm)×3 in (7.6 cm)×0.12 cm was mounted on the rotatable fixture of the polisher. The abrasive wheel was rotated at 2,000 rpm and the glass plate was rotated at 150 rpm. Water flowing at 20 ml/min was again used as coolant. The stage with polisher was continuously traversed into the edge of the abrasive wheel at a rate of 1.25 mm/min for 15 seconds, at which time the polisher was left in a stationary position and lapping was continued for an additional 5 seconds. The glass plate was removed from contacting the abrasive wheel via the stage and rotation of both the glass plate and abrasive wheel was stopped. The abrasive wheel was removed from the chuck and the abrasive wheel produced in Example 4 was mounted in the chuck. The abrasive wheel was rotated at 1,000 rpm and the glass plate was rotated at 150 rpm. Water flowing at 8 ml/min was again used as coolant. The stage with polisher was continuously traversed into the edge of the abrasive wheel at a rate of 25 µm/min for 2 minutes, at which time the polisher was left in a stationary position and lapping was continued for an additional 30 seconds. The glass was removed from the polisher. A profilometer scan (shown in FIG. 5), per the above test method, was conducted across the lapped region of the glass plate and the glass plate was observed to have a hemispherical recess of about 340 µm in depth with a diameter of about 11 mm.

Comparative Example A

This example describes the preparation of a non-abrasive wheel according to the present disclosure. A non-abrasive wheel was prepared using the same procedure as Example 1, except that the 3M TRIZACT 568XA ceria abrasive sheet was replaced with a sheet of 3M POLISHING FILM 968M (non-abrasive material), available from the 3M Company, producing a non-abrasive wheel (i.e., covered with an abrasive-free polishing pad).

Comparative Example B

This example describes a method for fabricating a dimple using a non-abrasive wheel in conjunction with abrasive slurry. The equipment, equipment configuration, and general lapping procedure described in Example 1 were used for the slurry process. The non-abrasive wheel of Comparative Example A was mounted in the chuck of the rotatable drive. A soda-lime glass plate, 2 in (5.1 cm)×3 in (7.6 cm)×0.12 cm was mounted on the rotatable fixture of the polisher. The non-abrasive wheel was rotated at 1,000 rpm and the glass plate was rotated at 120 rpm. Slurry was flowed to the non-abrasive wheel/glass interface during the process. The slurry was a 10 wt. % mixture of 0.5 µm cerium oxide in deionized water. The stage with polisher was continuously traversed into the edge of the abrasive wheel at a rate of 25 µm/min for 3 minutes, at which time the polisher was left in a stationary position and lapping was continued for an additional 30 seconds. The glass was removed from the polisher. A profilometer scan, per the above test method, was conducted across the lapped region of the glass plate and the glass plate was observed to have a hemispherical recess of about 45 µm in depth and a diameter of about 5.5 mm.

Figure 6:
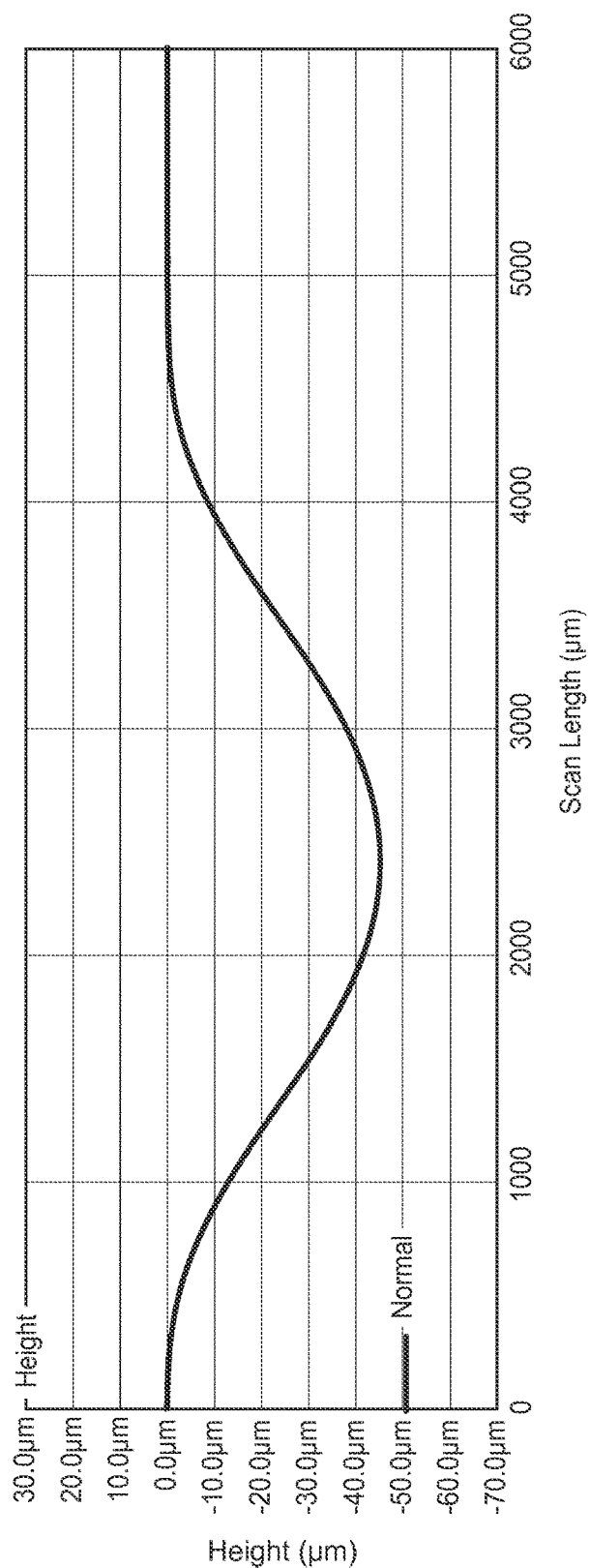
FIG. 6 is a surface profile of a dimple generated according to Comparative Example A.

Comparing the results of Example 2 (see FIG. 5) to those of Comparative Example B (See FIG. 6), the lapping process using the abrasive pad wheel produced a recess having sharper edge topography and a smaller diameter than that produced by a process employing a non-abrasive pad in conjunction with cerium oxide slurry.

Other than in the Background section, all cited references, patents, or patent applications, in the above application for letters patent are herein incorporated by reference in their entirety in a consistent manner. In the event of inconsistencies or contradictions between portions of the incorporated references and this application, the information in the preceding description shall control. The preceding description, given in order to enable one of ordinary skill in the art to practice the claimed disclosure, is not to be construed as limiting the scope of the disclosure, which is defined by the claims and all equivalents thereto.

What is claimed is:

1. A method of forming a recess in a surface of a substrate, the method comprising:
    providing an abrasive article comprising a structured abrasive member disposed along a peripheral surface of a support member, wherein the structured abrasive member comprises a structured abrasive layer comprising shaped abrasive composites secured to a backing, wherein the backing is proximate to the support member, and wherein the shaped abrasive composites comprise abrasive particles retained in a binder material;
    frictionally contacting the structured abrasive layer with the surface of the substrate;

longitudinally advancing the structured abrasive layer relative to the surface of the substrate; and rotating the substrate around a rotational axis perpendicular to the surface of the substrate such that the structured abrasive layer maintains contact with and abrades the surface of the substrate thereby forming the recess therein.

2. The method of claim 1, wherein the method is carried out in the absence of added loose abrasive particles or abrasive slurry.

3. The method of claim 1, wherein the abrasive article comprises an abrasive wheel or an abrasive belt.

4. The method of claim 1, wherein the abrasive particles comprise at least one of cerium oxide or diamond.

5. The method of claim 1, wherein the recess comprises a dimple.

6. The method of claim 1, wherein the recess comprises a ring.

7. The method of claim 1, wherein the substrate has a cylindrical passage extending therethrough perpendicular to the surface of the substrate, and wherein the rotational axis is collinear with the cylindrical passage.

8. The method of claim 1, wherein the recess has a continuously concave surface.

9. The method of claim 1, wherein the substrate is selected from the group consisting of a glass sheet and a sapphire sheet.

* * * * *